(12) United States Patent
Henry et al.

(10) Patent No.: US 8,804,502 B2
(45) Date of Patent: Aug. 12, 2014

(54) EMERGENCY BACKHAUL LINKS FOR WIRELESS TELECOMMUNICATIONS NETWORKS

(75) Inventors: Paul Henry, Holmdel, NJ (US); Byoung-Jo Kim, Morganville, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 323 days.

(21) Appl. No.: 13/170,246

(22) Filed: Jun. 28, 2011

(65) Prior Publication Data
US 2013/0003534 A1 Jan. 3, 2013

(51) Int. Cl.
H04L 12/26 (2006.01)
H04W 40/00 (2009.01)
H04L 12/56 (2006.01)

(52) U.S. Cl.
CPC ............ *H04W 40/00* (2013.01); *H04L 45/22* (2013.01); *H04L 45/28* (2013.01); *H04L 12/26* (2013.01)
USPC ............................................. 370/228; 455/9

(58) Field of Classification Search
CPC .................................................. H04W 40/00
USPC ............................................. 370/228; 455/9
See application file for complete search history.

(56) References Cited

U.S. PATENT DOCUMENTS

| | | | |
|---|---|---|---|
| 7,321,571 B2 | 1/2008 | Schnack et al. | |
| 7,835,272 B1 | 11/2010 | Johnson et al. | |
| 2009/0285134 A1* | 11/2009 | Struhsaker et al. | 370/280 |
| 2013/0035033 A1* | 2/2013 | Sanneck et al. | 455/9 |
| 2013/0331115 A1* | 12/2013 | Falconetti et al. | 455/452.2 |

OTHER PUBLICATIONS

Kanchei Loa et al.; "IMT-Advanced Relay Standards"; WiMAX/LTE Update, IEEE Communications Magazine, Aug. 2010, pp. 40-48.

* cited by examiner

*Primary Examiner* — Wei Zhao
(74) *Attorney, Agent, or Firm* — Hartman & Citrin LLC (57) ABSTRACT

An emergency backhaul link is created between a first radio base station and a second radio base station over an air interface in response to an interruption or failure of a primary backhaul link of the first radio base station. In some embodiments, the first radio base station and the second radio base station are provided with no additional equipment to support the emergency backhaul link. In other embodiments, the second radio base station includes a tunable receiver configured to switch between receiving mobile device traffic on an uplink frequency and receiving backhaul traffic on a downlink frequency. In other embodiments, the second radio base station includes a receiver configured to receive backhaul traffic from the first radio base station over a downlink frequency. After the primary backhaul link is restored, the emergency backhaul link is torn down and backhaul traffic resumes on the primary backhaul link.

19 Claims, 7 Drawing Sheets

EMERGENCY BACKHAUL LINKS FOR WIRELESS TELECOMMUNICATIONS NETWORKS

BACKGROUND

This application relates generally to backhaul networking in wireless telecommunications networks and, more particularly, to providing a temporary emergency backhaul link for a radio base station ("RBS") over an air interface in response to an interruption or failure of a primary backhaul link of the RBS.

Protecting against backhaul link failures is a fundamental principle of telecomm networking. In a technique called dual diversity protection, two physically distinct links are used to connect two nodes of a network, so that if one of the links fails, backhaul traffic can be diverted to the other link, thus maintaining service on the network. Providing such diversity is particularly difficult in the case of cellular base stations because of the cost of installing separate links to each base station. This difficulty is exacerbated when the base stations are out-of-region (i.e., in territory where a cellular operator does not provide land-line services). In many cases, the cost of backhaul diversity is so high that diversity protection is not installed at all, leaving base stations exposed to a single point of failure.

Other diversity solutions such as microwave backhaul have been proposed. Microwave backhaul involves the installation of a separate radio system on each base station. Microwave backhaul often requires a Federal Communications Commission ("FCC") license and often also requires frequency coordination with all other users of the microwave band in the locale surrounding a particular base station.

SUMMARY

According to one aspect presented herein, an emergency backhaul link is created between a first radio base station and a second radio base station over an air interface in response to an interruption or failure of a primary backhaul link of the first radio base station. In some embodiments, the first radio base station and the second radio base station are provided with no additional equipment to support the emergency backhaul link. In other embodiments, the second radio base station includes a tunable receiver configured to switch between receiving mobile device traffic on an uplink frequency and receiving backhaul traffic on a downlink frequency. In other embodiments, the second radio base station includes a receiver configured to receive backhaul traffic from the first radio base station over a downlink frequency. After the primary backhaul link is restored, the emergency backhaul link is torn down and backhaul traffic resumes on the primary backhaul link.

According to another aspect presented herein, a method for routing backhaul traffic in a wireless telecommunications network includes detecting, at a first radio base station, a backhaul link failure condition of a backhaul link of the first radio base station, establishing an emergency backhaul link with a second radio base station over an air interface in response to detecting the backhaul link failure condition of the backhaul link, and performing at least one of transmitting, at the first radio base station, outbound backhaul traffic to the second radio base station and receiving, at the first radio base station, inbound backhaul traffic from the second radio base station via the emergency backhaul link established over the air interface.

In some embodiments, detecting, at the first radio base station, a backhaul link failure condition includes the first radio base station receiving a notification from a network controller that the backhaul link failure condition exists. In other embodiments, detecting, at the first radio base station, a backhaul link failure condition includes the first radio base station identifying the existence of the backhaul link failure condition.

According to another aspect presented herein, a first radio base station includes an air interface component, a backhaul interface component, a processor, and a memory in communication with the processor. The memory includes instructions that, when executed, cause the processor at least to detect a backhaul link failure condition of a backhaul link of the first radio base station established via the backhaul interface, establish an emergency backhaul link to a second radio base station over an air interface via the air interface component in response to detecting the backhaul link failure condition of the backhaul link, and transmit the backhaul traffic of the first radio base station to the second radio base station via the emergency backhaul link established over the air interface via the air interface component.

According to yet another aspect presented herein, a wireless telecommunications network includes a first radio base station and a second base station. The first radio base station is configured to detect a backhaul link failure condition of a first backhaul link of the first radio base station, establish an emergency backhaul link to the second radio base station over an air interface in response to detecting the backhaul link failure condition of the backhaul link, and transmit the backhaul traffic of the first radio base station to the second radio base station via the emergency backhaul link established over the air interface. The second radio base station is configured to receive the backhaul traffic from the first radio base station and send the backhaul traffic over a second backhaul link to a controller to which the second radio base station is configured to send its backhaul traffic.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to providing an emergency backhaul link between a first radio base station ("RBS") and a second RBS over an air interface in response to an interruption or failure of a primary backhaul link of the first RBS. While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including radio base stations, hand-held devices, multiprocessor systems, microprocessor-based or programmable consumer electronics, minicomputers, mainframe computers, and the like.

Figure 1:
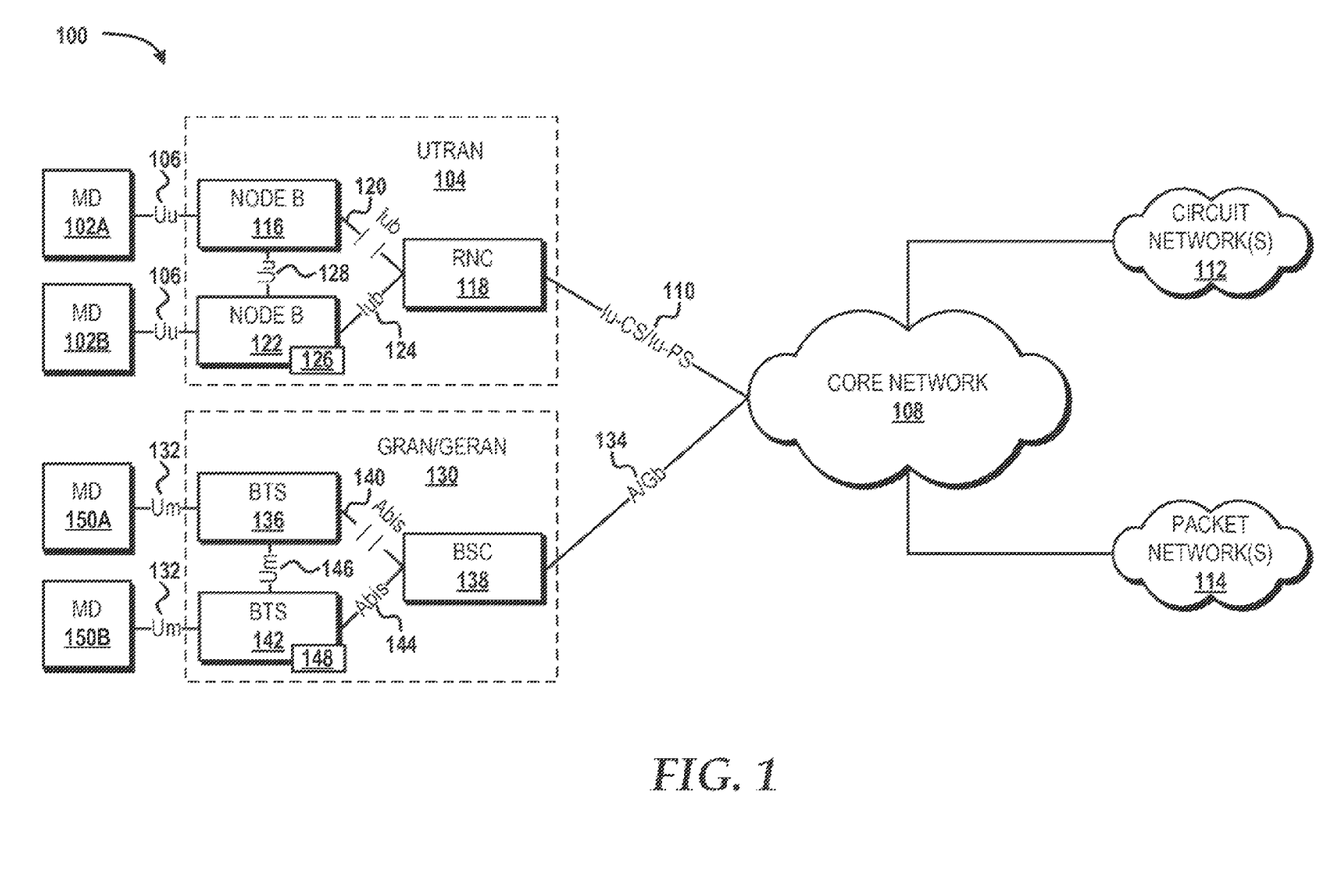
FIG. 1 is a network architecture diagram schematically illustrating an exemplary operating environment for implementing various embodiments presented herein.

Referring now to FIG. 1, aspects of a network 100 for various embodiments presented herein will be described. The network 100 is illustrated and described in context of a Universal Mobile Telecommunications System/Universal Mobile Telephone System ("UMTS") network and a Global System for Mobile communications ("GSM") network. Although various aspects are disclosed in this particular context, those skilled in the art will appreciate the applicability of many of the disclosed aspects to other mobile telecommunications technologies such as, but not limited to, Code Division Multiple Access ("CDMA") ONE, CDMA2000, Long Term Evolution ("LTE"), and various other 2G, 2.5G, 3G, 4G, and greater generation mobile telecommunications technologies. In addition, mobile data communications technologies such as General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), and various other current and future mobile data communications technologies are contemplated. Therefore, the embodiments presented herein should not be construed as being limited to a particular mobile telecommunications technology and/or standards utilizing such technologies.

It is contemplated that the network 100 may not include all of the network elements shown in FIG. 1, may include other network elements that are not explicitly shown in FIG. 1, may include multiples of the network elements that are explicitly shown in FIG. 1, and/or may utilize an architecture completely different than that shown in FIG. 1. Moreover, various aspects of the disclosed architecture have been simplified for ease of illustration and explanation.

The illustrated network 100 includes mobile communications devices ("MDs") 102A, 102B. The MDs 102A, 102B may be cellular telephones or computers configured with an integrated or an external, removable access component that facilitates wireless communication with the network 100. In some embodiments, the access component is a cellular telephone that is in wired or wireless communication with the computer to facilitate a tethered data connection to the network 100. In other embodiments, the access component includes a wireless transceiver configured to send and receive data from the network 100 and a universal serial bus ("USB") or another communication interface for connection to the computer to enable tethering. In any case, the MDs 102 are configured to wirelessly communicate with a UMTS Terrestrial Radio Access Network ("UTRAN") 104 via a Uu air (radio) interface 106, as shown in the illustrated embodiment.

The UTRAN 104 is in communication with a core network 108. In particular, the UTRAN 104 is in communication with a circuit-switched core network ("CS CN") and a packet-switched core network ("PS CN") via an Iu-CS interface and an Iu-PS interface, respectively. These interfaces are illustrated collectively as an Iu-CS/Iu-PS interface 110.

The core network 108 is in communication with one or more circuit networks 112, such as a Public Switched Telephone Network ("PSTN"), an Integrated Services Digital Network ("ISDN"), or other circuit-switched network. The core network 108 is also in communication with one or more packet networks 114, such as an internet, an intranet, or other packet-switched network.

Referring again to the UTRAN 104, as illustrated, the UTRAN 104 includes a first node B 116 and a radio network controller ("RNC") 118. The first node B 116 is a terminating node of the UTRAN 104 for the Uu air interface 106. The first node B 116 includes one or more transceivers and one or more antennas configured to facilitate the transmission and reception of voice and/or data traffic to and from the MDs 102A, 102B (102A in the illustrated embodiment) across the Uu air interface 106. The first node B 116 is also configured to provide voice and/or data traffic and UMTS signaling to the RNC 118 via a first UMTS backhaul link 120 provided by an Iub interface. In some embodiments, the first UMTS backhaul link 120 includes fiber-optic cabling. In some embodiments, the first UMTS backhaul link 120 includes coaxial cabling. In some embodiments, the first UMTS backhaul link 120 includes twisted pair cabling. It should be understood that these types of physical linkage are merely exemplary and other types of physical linkage may be used to connect the first node B 116 and the RNC 118 to facilitate backhaul traffic flow between the first node B 116 and the RNC 118.

In the illustrated embodiment, the first UMTS backhaul link 120 has been compromised such that communications between the first node B 116 and the RNC 118 cannot be carried out in accordance with normal operations. By way of example and not limitation, the first UMTS backhaul link 120 may have been damaged (e.g., completely or partially severed), performance of the first UMTS backhaul link 120 may have fallen below a predefined performance threshold for one or more performance metrics such as data rate or latency, equipment used to facilitate the first UMTS backhaul link 120 may have been damaged or may have failed in some other manner, and/or the service provider operating the first UMTS backhaul link 120 may have erred in some way. The first UMTS backhaul link 120 alternatively may be down for maintenance, routine or otherwise.

The illustrated UTRAN 104 also includes a second node B 122. The second node B 122 is also a terminating node of the UTRAN 104 for the Uu air interface 106. The second node B 122 also includes one or more transceivers and one or more antennas configured to facilitate the transmission and reception of voice and/or data traffic to and from the MDs 102A, 102B (102B in the illustrated embodiment) across the Uu air interface 106. The second node B 122 is also configured to provide voice and/or data traffic and UMTS signaling to the RNC 118 via a second UMTS backhaul link 124 provided by an Iub interface. As with the first UMTS backhaul link 120, in some embodiments, the second UMTS backhaul link 124 includes fiber-optic cabling. In some embodiments, the second UMTS backhaul link 124 includes coaxial cabling. It should be understood that these types of physical linkage are merely exemplary and other types of physical linkage may be used to connect the second node B 122 and the RNC 118 to facilitate backhaul traffic flow between the second node B 122 and the RNC 118.

The RNC 118 is configured to allocate radio resources to the MDs 102A, 102B, apply codes to describe channels in accordance with Wideband Code Division Multiple Access ("W-CDMA") protocol, and control handovers between the node Bs 116, 122 and/or one or more other node Bs (not shown). The RNC 118 also acts a concentrator, so that many different low capacity connections to the node Bs 116, 122 become reduced to a smaller number of connections towards the core network 108 via the Iu-CS/Iu-PS interface 110.

In the illustrated embodiment, the first node B 116 establishes a temporary emergency backhaul link 128 over a Uu air interface with the second node B 122 in response to the first backhaul link 120 having been compromised. In some embodiments, the node B 116 generates a broadcast message (not shown) including a request to establish the temporary emergency backhaul link 128. The broadcast message may be sent to the second node B 122 and to one or more additional node Bs. The node Bs to which the node B 122 sends the broadcast message may be any node Bs capable of receiving the broadcast message. Alternatively, in some embodiments, the second node B 122 generates a directed message (also not shown) including a request to establish the temporary emergency backhaul link 128. In some embodiments, the directed message is sent by the first node B 116 to one or more node Bs (e.g., the second node B 122) that reside within a given distance of the first node B 116, or a preset group of node Bs determined by some other criterion. In some embodiments, a preset group of node Bs is defined by a service provider operating the first node B 116. Moreover, the preset group of node Bs may identify node Bs the first node B 116 communicate with. For example, the first node B 116 may be in direct line-of-sight of one or more other node Bs but out of direct line-of-sight with one or more other node Bs. The node Bs with which the first node B 116 has a direct line-of-sight may be configured as priority node Bs such that the directed message is first sent to one or more priority node Bs before then sending the directed message to node Bs that are associated with a lesser priority and so on. It is contemplated that the list of node Bs and/or the priority with which the first node B 116 attempts to send a message to the node Bs may be dynamic to account for variations in radio propagation characteristics between the first node B 116 and a given target node B.

In some embodiments, the temporary emergency backhaul link 128 is established between the first node B 116 and the second node B 122 in accordance with a registration procedure similar to that of a typical registration procedure performed between a MD and a node B. By way of example and not limitation, the first node B 116 may register with the second node B 122 as a MD in accordance with UMTS registration procedures.

Communications between the first node B 116 and the second node B 122 may be carried out utilizing frequency division duplexing ("FDD"), as will be described in greater detail below with reference to FIG. 3. In these embodiments, the second node B 122 includes a backhaul module ("BM") 126. The BM 126, in some embodiments, is implemented as a hardware component including a receiver, or a transmitter and receiver. The BM 126, in other embodiments, is implemented as a software component of the second node B 122. In these embodiments, the second node B 122 may be configured to execute instructions of the software component to tune a receiver of the second node B 122 so that the second node B 122 can receive communications on an uplink frequency ("$F_u$") or a downlink frequency ("$F_d$") as needed, and/or may be configured to execute instructions of the software component to tune a transmitter of the second node B 122 so that the second node B 122 can transmit communications on $F_u$ or $F_d$ as needed. It should be understood that any additional transmitter or receiver may be connected to existing antennae of the second node B 122. It should also be understood that no expensive equipment, such as a directional antennae, is needed in the following implementations.

In some embodiments, the BM 126 includes a receiver and a transmitter. The receiver of the BM 126 is configured to listen to and receive backhaul traffic from the first node B 116 at $F_d$. The transmitter of the BM 126 is configured to transmit communications to the first node B 116 at $F_u$. Alternatively, in some embodiments, the BM 126 is embodied as a software component that is used to tune an existing receiver of the second node B 122 to listen to and receive backhaul traffic from the first node B 116 at $F_d$ and tune an existing transmitter of the second node B 122 to transmit communications to the first node B 116 at $F_u$. Those skilled in the art will appreciate that receiving at $F_d$ and transmitting at $F_u$ are not normal operations. These embodiments are illustrated as part of Timing Plan A 302 illustrated in FIG. 3.

In some embodiments, the BM 126 includes a receiver configured to listen to and receive communications from the first node B 116 at $F_d$. Alternatively, in some embodiments, the BM 126 is embodied as a software component that is used to tune an existing receiver of the second node B 122 to listen to and receive backhaul traffic from the first node B 116 at an $F_d$. These embodiments are illustrated as part of Timing Plan B 304 illustrated in FIG. 3.

Communications between the first node B 116 and the second node B 122 alternatively may be carried out utilizing time division duplexing ("TDD"), as will be described in greater detail below with reference to FIG. 5. In these embodiments, no additional equipment, such as the BM 126, is needed.

The illustrated network 100 also includes MDs 150A, 150B. The MDs 150A, 150B may be cellular telephones or computers configured with an integrated or an external, removable access component that facilitates wireless communication with the network 100. In some embodiments, the access component is a cellular telephone that is in wired or wireless communication with the computer to facilitate a tethered data connection to the network 100. In other embodiments, the access component includes a wireless transceiver configured to send and receive data from the network 100 and a universal serial bus ("USB") or another communication interface for connection to the computer to enable tethering. In any case, the MDs 150A, 150B are configured to wirelessly communicate with a GSM Radio Access Network/GSM EDGE Radio Access Network ("GRAN/GERAN") 130 via a Um air (radio) interface 132, as shown in the illustrated embodiment.

The GRAN/GERAN 130 is in communication with the core network 108 via an A/Gb interface 134. The core network 108 is described in greater detail above.

The illustrated GRAN/GERAN 130 includes a first base transceiver station ("BTS") 136 and a base station controller ("BSC") 138. The first BTS 136 is a terminating node of the GRAN/GERAN 130 for the Um air interface 132. The first BTS 136 includes one or more transceivers and one or more antennas configured to facilitate the transmission and reception of voice and/or data traffic to and from the MDs 150A, 150B (150A in the illustrated embodiment) across the Um air interface 132. The first BTS 136 is also configured to provide voice and/or data traffic and GSM signaling to the BSC 138 via a first GSM backhaul link 140 provided by an Abis interface. In some embodiments, the first GSM backhaul link 140 includes fiber-optic cabling. In some embodiments, the first GSM backhaul link 140 includes coaxial cabling. In some embodiments, the first GSM backhaul link 140 includes twisted pair cabling. It should be understood that these types of physical linkage are merely exemplary and other types of physical linkage may be used to connect the first BTS 136 and the BSC 138 to facilitate backhaul traffic flow between the first BTS 136 and the BSC 138.

The BSC 138 is configured to allocate radio resources to the MDs 150A, 150B, administer frequencies, and control handovers between BTSs (except in the case of an inter-Mobile Switching Center (MSC) handover in which case control is in part the responsibility of the MSC). One function of the BSC 138 is to act as a concentrator, so that many different low capacity connections to BTSs become reduced to a smaller number of connections towards the MSC in the core network 108. The BSC 138 may be logically associated with a packet control unit ("PCU") (not shown) when GPRS/EDGE capabilities are employed. A PCU is configured to support radio related aspects of GPRS/EDGE when connected to a GSM network. A PCU is in communication with the core network 108 via the Gb interface (illustrated as being a combined A/Gb interface 134).

In the illustrated embodiment, the first GSM backhaul link 140 has been compromised such that communications between the first BTS 136 and the BSC 138 cannot be carried out in accordance with normal operations. By way of example and not limitation, the first GSM backhaul link 140 may have been damaged (e.g., completely or partially severed), performance of the first GSM backhaul link 140 may have fallen below a predefined performance threshold for one or more performance metrics such as data rate or latency, equipment used to facilitate the first GSM backhaul link 140 may have been damaged or may have failed in some other manner, and/or the service provider operating the first GSM backhaul link 140 may have erred in some way. The first GSM backhaul link 140 alternatively may be down for maintenance, routine or otherwise.

The illustrated GRAN/GERAN 130 also includes a second BTS 142. The second BTS 142 is also a terminating node of the GRAN/GERAN 130 for the Um air interface 132. The second BTS 142 also includes one or more transceivers and one or more antennas configured to facilitate the transmission and reception of voice and/or data traffic to and from the MDs 150A, 150B (150B in the illustrated embodiment) across the Um air interface 132. The second BTS 142 is also configured to provide voice and/or data traffic and GSM signaling to the BSC 138 via a second GSM backhaul link 144 provided by an Abis interface. As with the first GSM backhaul link 140, in some embodiments, the second GSM backhaul link 144 includes fiber-optic cabling. In some embodiments, the second GSM backhaul link 144 includes coaxial cabling. In some embodiments, the second GSM backhaul link 144 includes twisted pair cabling. It should be understood that these types of physical linkage are merely exemplary and other types of physical linkage may be used to connect the second BTS 142 and the BSC 138 to facilitate backhaul traffic flow between the second BTS 142 and the BSC 138.

In the illustrated embodiment, the first BTS 136 establishes a temporary emergency backhaul link 146 over a Um air interface with the second BTS 142 in response to the first GSM backhaul link 140 having been compromised. In some embodiments, the first BTS 136 generates a broadcast message (not shown) including a request to establish the temporary emergency backhaul link 146. The broadcast message may be sent to the second BTS 142 and to one or more additional BTSs. The BTSs to which the first BTS 136 sends the broadcast message may be any BTSs capable of receiving the broadcast message. Alternatively, in some embodiments, the first BTS 136 generates a directed message (also not shown) including a request to establish the temporary emergency backhaul link 146. In some embodiments, the directed message is sent by the first BTS 136 to one or more BTSs (e.g., the second BTS 142) that reside within a given distance of the first BTS 136, or a preset group of BTSs determined by some other criterion. In some embodiments, a preset group of BTSs is defined by a service provider operating the first BTS 136. Moreover, the preset group of BTSs may identify BTSs with which the first BTS 136 can communicate. For example, the first BTS 136 may be in direct line-of-sight of one or more other BTSs but out of direct line-of-sight with one or more other BTSs. The BTSs with which the first BTS 136 has a direct line-of-sight may be configured as priority BTSs such that the directed message is first sent to one or more priority BTSs before then sending the directed message to BTSs that are associated with a lesser priority and so on. It is contemplated that the list of BTSs and/or the priority with which the first BTS 136 attempts to send a message to the BTSs may be dynamic to account for variations in radio propagation characteristics between the first BTS 136 and a given target BTS.

In some embodiments, the temporary emergency backhaul link 146 is established between the first BTS 136 and the second BTS 142 in accordance with a registration procedure similar to that of a typical registration procedure performed between a MD and a BTS. By way of example and not limitation, the first BTS 136 may register with the second BTS 142 as a typical MD in accordance with GSM registration procedures.

Communications between the first BTS 136 and the second BTS 142 may be carried out utilizing FDD, as will be described in greater detail below with reference to FIG. 3. In these embodiments, the second BTS 142 includes a backhaul module ("BM") 148. The BM 148, in some embodiments, is implemented as a hardware component including a receiver, or a transmitter and receiver. The BM 148, in other embodiments, is implemented as a software component of the second BTS 142. In these embodiments, the second BTS 142 may be configured to execute instructions of the software component to tune a receiver of the second BTS 142 so that the second BTS 142 can receive communications at $F_u$ or $F_d$ as needed, and/or may be configured to execute instructions of the software component to tune a transmitter of the second BTS 142 so that the second BTS 142 can transmit communications on $F_u$ or $F_d$ as needed. It should be understood that any additional transmitter or receiver may be connected to existing antennae of the second BTS 142. It should also be understood that no expensive equipment, such as directional antennae, is needed in the following implementations.

In some embodiments, the BM 148 includes a receiver and a transmitter. The receiver of the BM 148 is configured to listen to and receive communications (i.e., backhaul traffic) from the first BTS 136 at $F_d$. The transmitter of the BM 126 is configured to transmit communications to the first BTS 136 at an uplink frequency ("$F_u$"). Alternatively, in some embodiments, the BM 148 is embodied as a software component that is used to tune an existing receiver of the second BTS 142 to listen to and receive backhaul traffic from the first BTS 136 at $F_d$ and tune an existing transmitter of the second BTS 142 to transmit communications to the first BTS 136 at $F_u$. Those skilled in the art will appreciate that receiving at $F_d$ and transmitting at $F_u$ are not normal FDD operations. These embodiments are illustrated as part of Timing Plan A 302 illustrated in FIG. 3.

In some embodiments, the BM 148 includes a receiver configured to listen to and receive communications from the first BTS 136 at $F_d$. Alternatively, in some embodiments, the BM 148 embodied as a software component that is used to tune an existing receiver of the second BTS 142 to listen to and receive backhaul traffic from the first BTS 136 at $F_d$. These embodiments are illustrated as part of Timing Plan B 304 illustrated in FIG. 3.

Communications between the first BTS 136 and the second BTS 142 alternatively may be carried out utilizing TDD, as will be described in greater detail below with reference to FIG. 5. In these embodiments, no additional equipment, such as the BM 148, is needed.

For ease of explanation of the remaining FIGURES, BTSs and node Bs are referred to herein collectively as radio base stations ("RBSs"). In particular, the first node B 116 and the first BTS 136 are collectively referred to herein as a first RBS, and the second node B 122 and the second BTS 142 are collectively referred to herein as a second RBS. Similarly, the first RBS and the second RBS may be representative of other radio base stations including, but not limited to, e-node Bs as are utilized by LTE-based networks.

Figure 2:
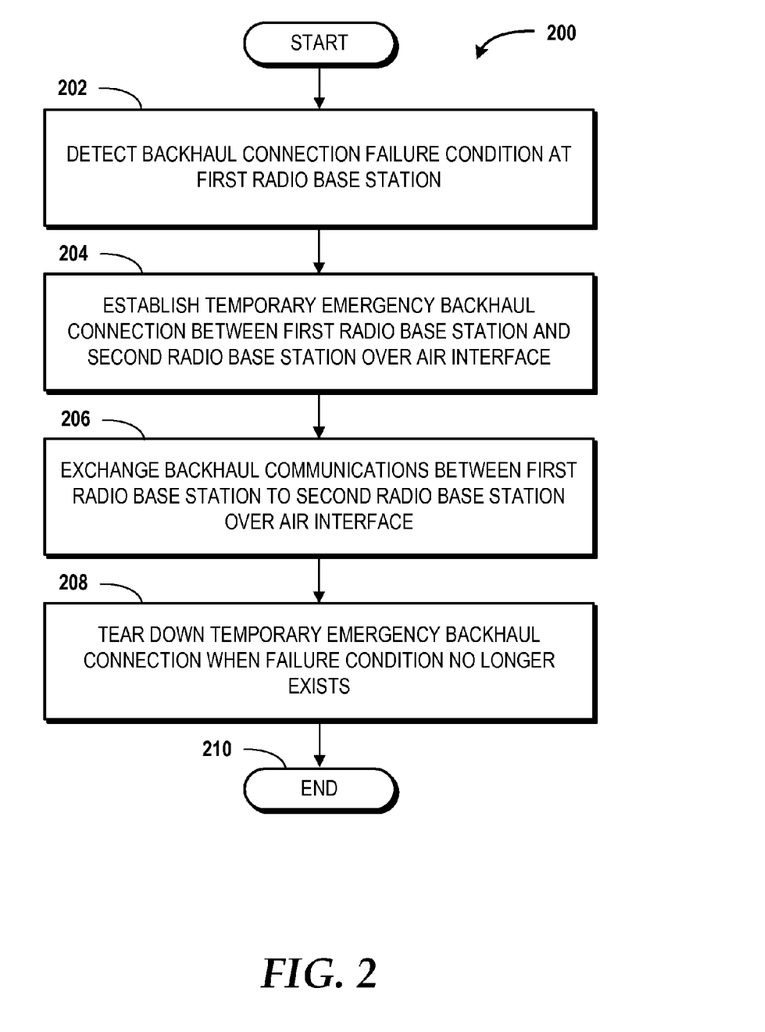
FIG. 2 is a flow diagram showing aspects of a method for establishing a temporary backhaul link between a first radio base station ("RBS") that has detected a backhaul link failure condition and a second RBS that has an operational backhaul, according to an exemplary embodiment.

Turning now to FIG. 2, aspects of a method 200 for establishing a temporary emergency backhaul link between a first RBS that has detected a backhaul link failure condition and a second RBS that has an operational backhaul will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, processor-based, programmable consumer electronics, one or more of the network elements described above with reference to FIG. 1, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by one or more of the node Bs 116, 122 and the BTSs 136, 142. It should be understood that these embodiments are exemplary, and should not be viewed as being limiting in any way.

As described above, a backhaul link (e.g., the first UMTS backhaul link 120 or the first GSM backhaul link 140) may have been damaged (e.g., completely or partially severed), performance of the backhaul link may have fallen below a predefined performance threshold for one or more performance metrics such as data rate or latency, equipment used to facilitate the backhaul link may have been damaged or may have failed in some other manner, the service provider operating the backhaul link may have erred in some way, and/or the backhaul link may be down for maintenance, routine or otherwise. The above are types of backhaul link failure conditions that may prompt the first RBS to establish a temporary emergency backhaul link with the second RBS. These backhaul link failure conditions should not be considered limiting in any way.

The method 200 begins and proceeds to operation 202, wherein the first RBS detects a backhaul link failure condition. Alternatively, the first RBS may receive a notification from a network controller, such as an RNC or BSC, indicating the existence of a backhaul link failure condition. As such, the network controller may actually initially detect the backhaul failure condition, after which the first RBS detects the backhaul link failure condition through receipt of the notification. From operation 202, the method 200 proceeds to operation 204, wherein the first RBS establishes a temporary emergency backhaul link (e.g., the temporary emergency backhaul link 128 or the temporary emergency backhaul link 146) with the second RBS.

In some embodiments, the first RBS generates a broadcast message including a request to establish the temporary emergency backhaul link. The broadcast message may be sent to the second RBS and to one or more additional RBSs. The RBSs to which the first RBS sends the broadcast message may be any RBSs capable of receiving the broadcast message. Alternatively, in some embodiments, the first RBS generates a directed message including a request to establish the temporary emergency backhaul link. In some embodiments, the directed message is sent by the first RBS to one or more RBSs that reside within a given distance of the first RBS, or a preset group of RBSs determined by some other criterion. In some embodiments, a preset group of RBSs is defined by a service provider operating the first RBS. Moreover, the preset group of RBSs may identify RBSs with which the first RBS can communicate. For example, the first RBS may be in direct line-of-sight of one or more other RBSs but out of direct line-of-sight with one or more other RBSs. The RBSs with which the first RBS has a direct line-of-sight may be configured as priority RBSs such that the directed message is first sent to one or more priority RBSs before then sending the directed message to RBSs that are associated with a lesser priority and so on. It is contemplated that the list of RBSs and/or the priority with which the first RBS attempts to send a message to the RBSs may be dynamic to account for variations in radio propagation characteristics between the first RBS and a given target RBS.

In some embodiments, the temporary emergency backhaul link is established between the first RBS and the second RBS in accordance with a registration procedure similar to that of a typical registration procedure performed between a MD and a RBS. By way of example and not limitation, the first RBS may register with the second RBS as a typical MD in accordance with registration procedures of a wireless communications standard.

From operation 204, the method 200 proceeds to operation 206, wherein the first RBS and the second RBS exchange backhaul traffic over the temporary emergency backhaul link. Backhaul traffic includes backhaul traffic originating from the first RBS directed toward a controller, such as a BSC or RNC, and backhaul traffic originating from the controller directed towards the first RBS. The operation 206 is performed until the backhaul link failure condition that was detected in operation 202 no longer exists, at which point, or after which point, the method 200 proceeds to operation 208.

At operation 208, the temporary emergency backhaul link is torn down. Initiation of the tear down may be performed by either the first RBS or the second RBS. In some embodiments, the first RBS detects that the backhaul link has been restored to an operational state and initiates tear down of the temporary emergency backhaul link, such as by deregistering with the second RBS. Alternatively, the first RBS may notify the second RBS that the temporary emergency backhaul link is no longer needed. This may prompt the second RBS to initiate tear down of the temporary emergency backhaul link.

From operation 208, the method 200 proceeds to operation 210. The method 200 ends at operation 210. It should be understood that the method 200 may repeat for one or more future failure conditions.

Figure 3:
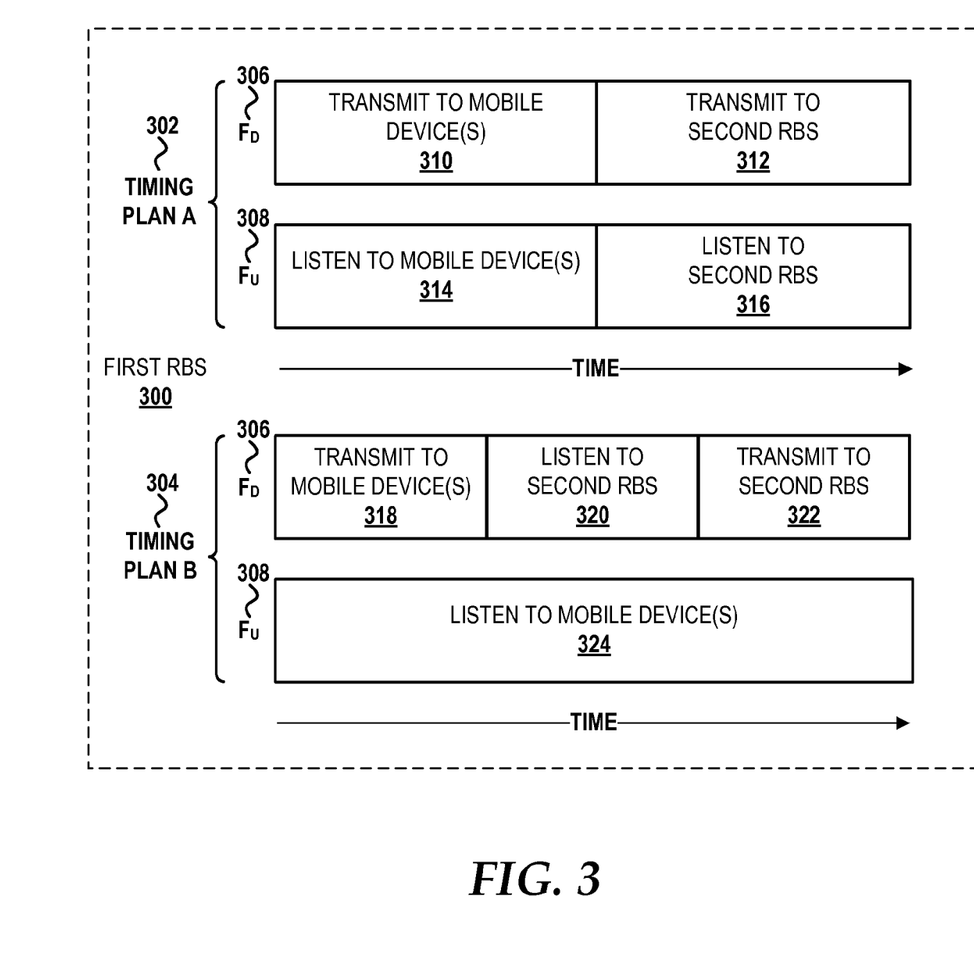
FIG. 3 is a diagram showing operations performed by a first RBS via a temporary backhaul link for frequency division duplex ("FDD") implementations, according to an exemplary embodiment.

Turning now to FIG. 3, a diagram showing operations performed by an exemplary first RBS 300 via a temporary backhaul link for FDD implementations will be described, according to exemplary embodiments. Two FDD implementations are illustrated: timing plan A 302 and timing plan B 304. The timing plans 302, 304 each include operations performed at a downlink frequency ("$F_d$") 306 and at an uplink frequency ("$F_u$") 308. As demonstrated by the illustrated time arrow, operations of the timing plans 302, 304 are performed by the first RBS 300 sequentially from left to right as time increases. The timing plan A 302 will now be described.

At $F_d$ 306, the first RBS 300 transmits communications to one or more MDs at operation 310. The first RBS 300 then transmits backhaul traffic over the temporary backhaul link to a second RBS at operation 312. At $F_u$ 308, the first RBS 300 listens to one or more MDs at operation 314 and then listens to the second RBS at operation 316.

For the timing plan B 304, at $F_d$ 306, the first RBS 300 transmits communications to one or more MDs at operation 318, listens to the second RBS at operation 320, and then transmits backhaul traffic over the temporary backhaul link to the second RBS at operation 322. At $F_u$ 308, the first RBS 300 listens to one or more MDs as illustrated by operation 324.

Figure 4:
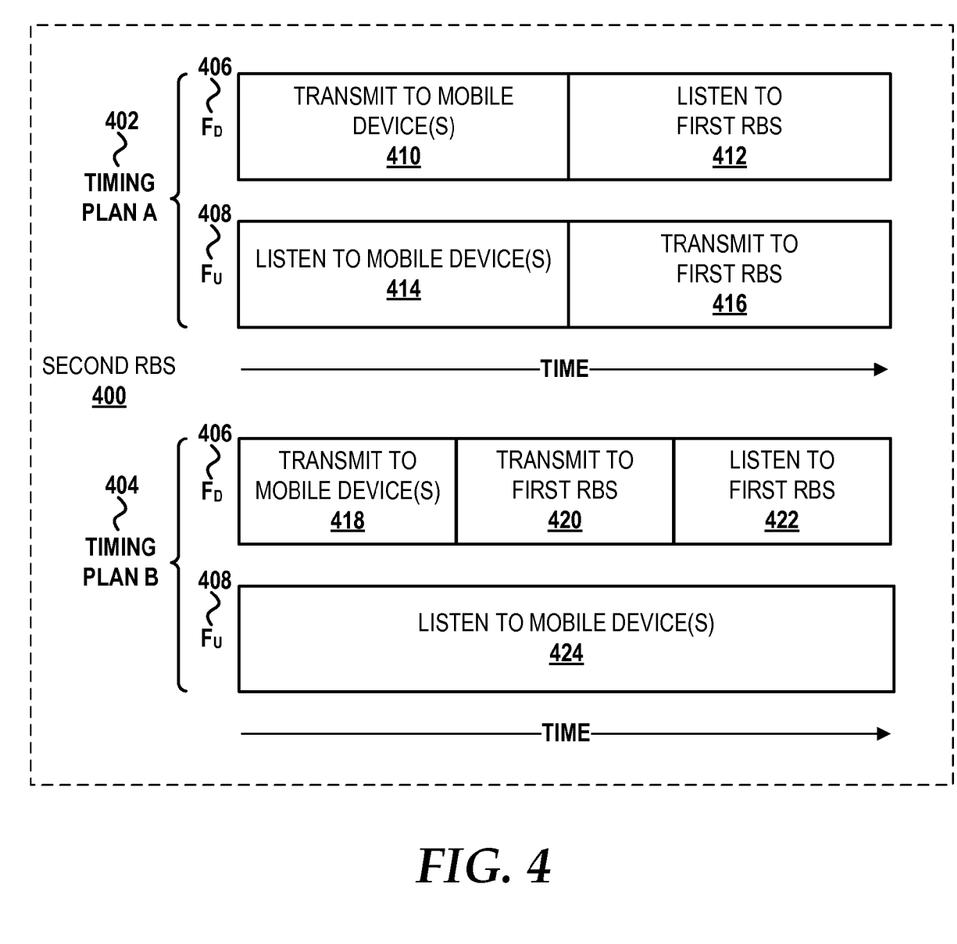
FIG. 4 is a diagram showing operations performed by a second RBS via a temporary backhaul link for FDD implementations, according to an exemplary embodiment.

Turning now to FIG. 4, a diagram showing operations performed by a second RBS 400 via a temporary backhaul link for FDD implementations will be described, according to exemplary embodiments. Two FDD implementations are illustrated: timing plan A 402 and timing plan B 404. The timing plans 402, 404 each include operations performed at an $F_d$ 406 and at an $F_u$ 408. As demonstrated by the illustrated time arrow, operations of the timing plans 402, 404 are performed by the second RBS 400 sequentially from left to right as time increases. The timing plan A 402 will now be described.

At $F_d$ 406, the second RBS 400 transmits communications to one or more MDs at operation 410. The second RBS 400 then listens to backhaul traffic from a first RBS over the temporary backhaul link. At $F_u$ 408, the second RBS 400 listens to one or more MDs at operation 414 and then transmits backhaul traffic to the first RBS over the temporary backhaul link.

For the timing plan B 404, at $F_d$ 406, the second RBS 400 transmits communications to one or more MDs at operation 418, transmits backhaul traffic to the first RBS over the temporary backhaul link at operation 420, and then listens to backhaul traffic from the first RBS at operation 422. At $F_u$ 408, the second RBS 400 listens to one or more MDs as illustrated by operation 424.

Figure 5:
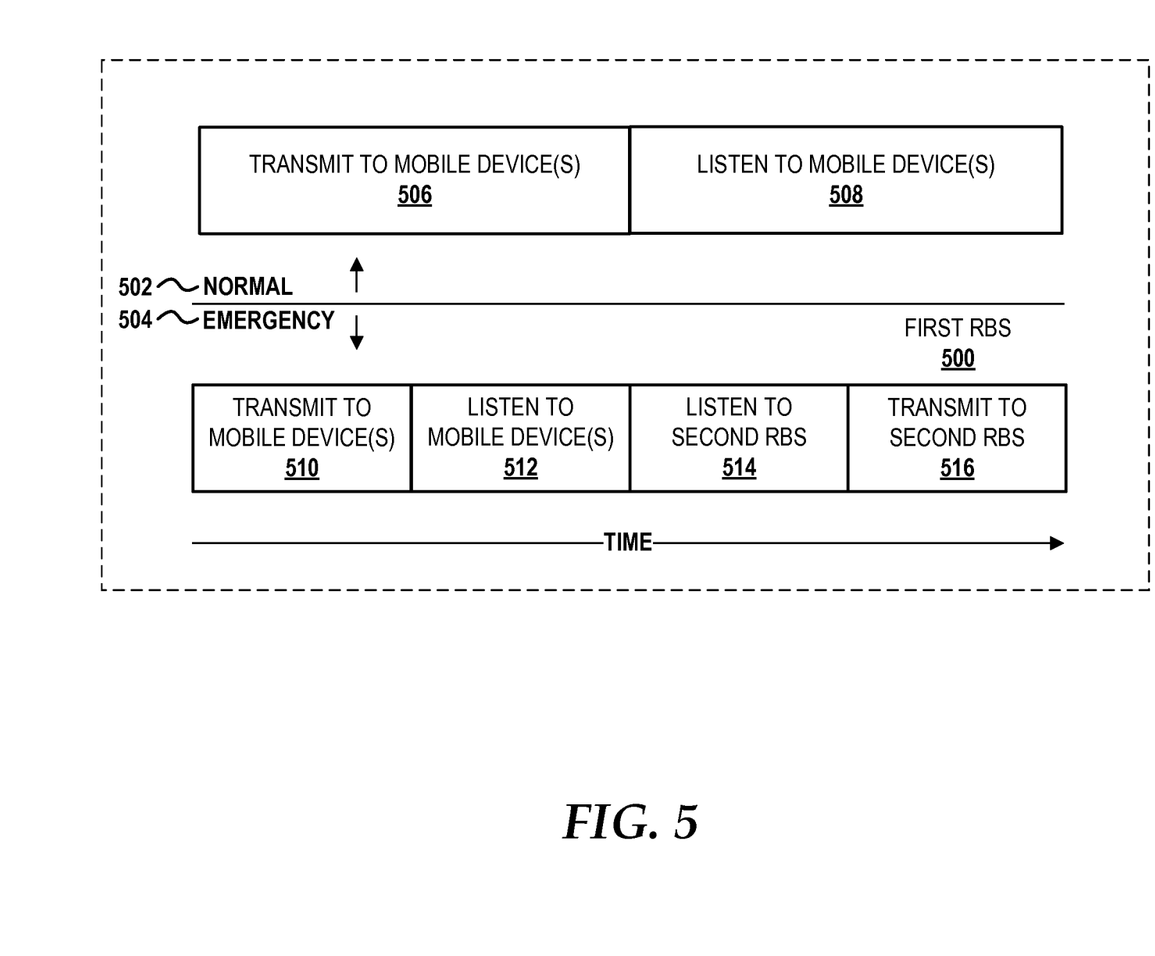
FIG. 5 is a diagram showing operations performed by a first RBS via a temporary backhaul link for time division duplex ("TDD") implementations, according to an exemplary embodiment.

Turning now to FIG. 5, a diagram showing operations performed by a first RBS 500 via a temporary backhaul link for TDD implementations will be described, according to an exemplary embodiment. In the illustrated embodiment, the first RBS 500 includes a normal operational mode 502 and an emergency operational mode 504, which is invoked when there is a backhaul failure at the first RBS. During the normal operational mode 502, the first RBS 500 is configured to transmit communications to one or more MDs at operation 506 and then listen to communications from one or more MDs at operation 508. During the emergency operational mode 504, the first RBS 500 is configured to transmit communications to one or more MDs at operation 510, listen to communications from one or more MDs at operation 512, listen to the second RBS at operation 514, and transmit to the second RBS at operation 516.

Figure 6:
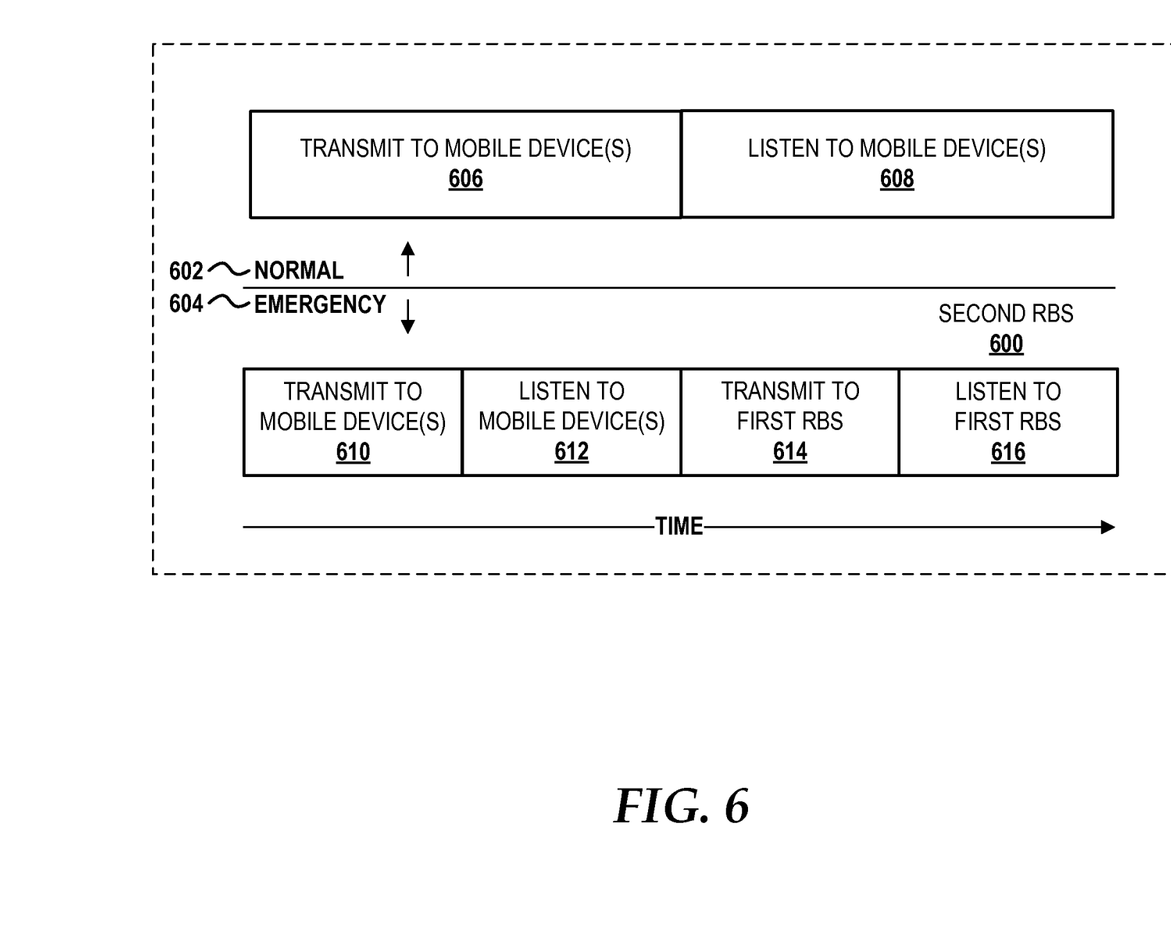
FIG. 6 is a diagram showing operations performed by a second RBS via a temporary backhaul link for TDD implementations, according to an exemplary embodiment.

Turning now to FIG. 6, a diagram showing operations performed by a second RBS 600 via a temporary backhaul link for TDD implementations will be described, according to an exemplary embodiment. In the illustrated embodiment, the second RBS 600 includes a normal operational mode 602 and an emergency operational mode 604. During the normal operational mode 602, the second RBS 600 is configured to transmit communications to one or more MDs at operation 606 and then listen to communications from one or more MDs at operation 608. During the emergency operational mode 604, the second RBS 600 is configured to transmit communications to one or more MDs at operation 610, listen to and communications from one or more MDs at operation 612, transmit backhaul traffic to the first RBS at operation 614, and listen to the first RBS at operation 616.

It should be understood that the sizes of the boxes for the various operations of the diagrams illustrated in FIGS. 3-6 are merely exemplary and are not intended to limit, in any way, the time period during which any of the operations are performed.

Figure 7:
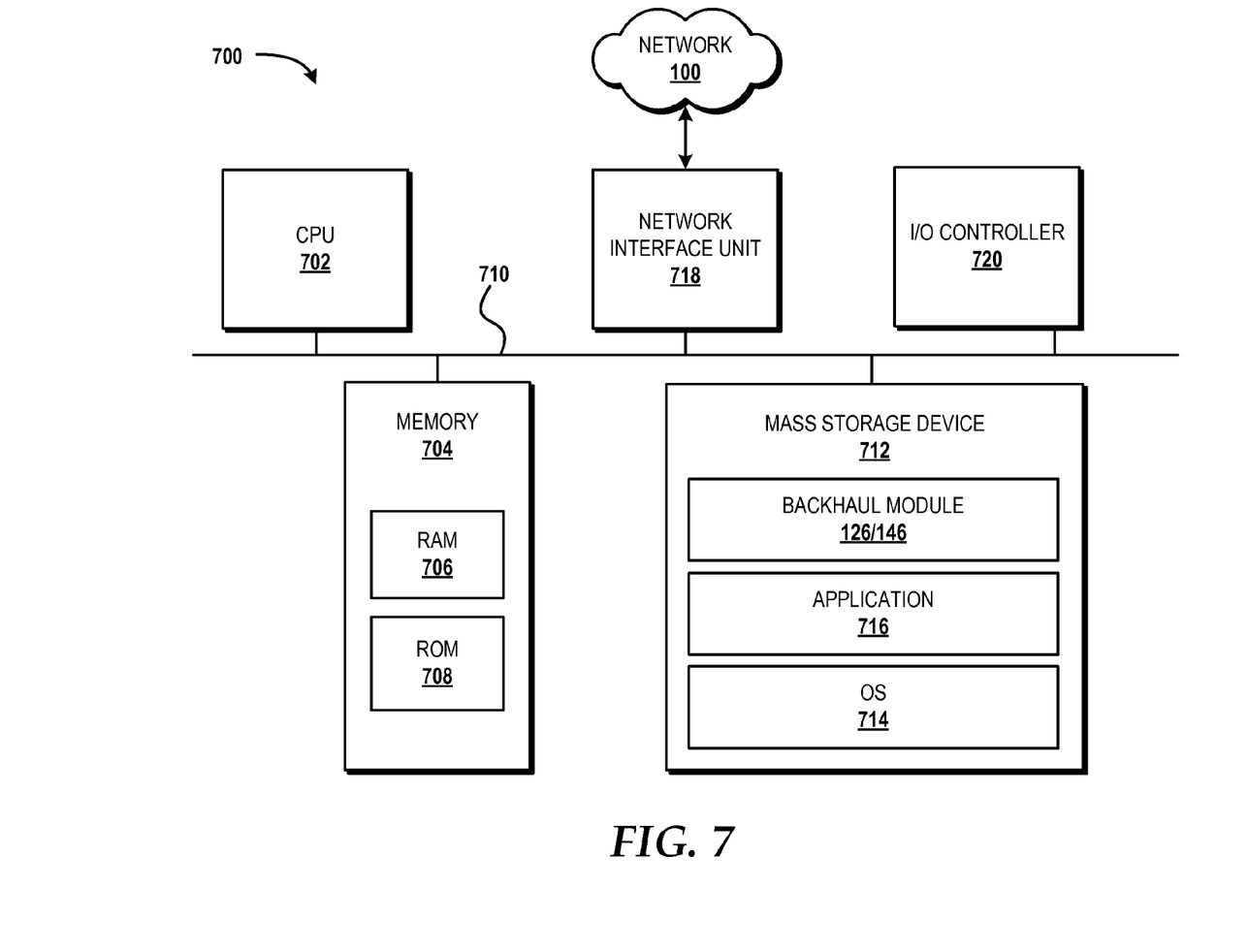
FIG. 7 is a computer architecture diagram illustrating an exemplary computer hardware and software architecture for an RBS capable of implementing aspects of the embodiments presented herein.

Turning now to FIG. 7, an exemplary computer architecture 700 for a computer system capable of executing the software components described herein will be described in detail. The computer architecture 700 illustrates an exemplary architecture for the RBSs disclosed herein. The computer architecture 700 may be utilized to execute any aspects of the software components presented herein.

The illustrated computer architecture 700 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing an operating system 714. The mass storage device 712 also includes an application 716 for performing the various functions of a RBS. It is contemplated that the application 716 additionally may be configured, for example, to detect a backhaul link failure condition, detect when the backhaul link failure condition no longer exists, and other aspects disclosed herein. The mass storage device 712 also includes a backhaul module 126, 148 for implementations that utilize a software backhaul module, as described in detail above.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium" and variations thereof, does not include waves, signals, and/or other transitory and/or intangible communication media, per se.

According to various embodiments, the computer architecture 700 may operate in a networked environment using logical connections to remote computers or network elements through a network such as the network 100. The computer architecture 700 may connect to the network 100 through a network interface unit 718 connected to the bus 710. The network interface unit 718 includes backhaul interface components for communications with a controller (e.g., the RNC 118 or the BSC 138) and air interface components for communicating with MDs (e.g., the MDs 102A, 102B, 150A, 150B) and another RBS over an air interface to effect an emergency backhaul connection. In some embodiments, the network interface unit 718 includes or is in communications with the BM 126, 148. It should be appreciated that the network interface unit 718 also may be utilized to connect to other types of networks and remote computer systems.

The computer architecture 700 also may include an input/output controller 720 for receiving and processing input from a number of other devices, including a keyboard, mouse, electronic stylus, or other input device (not shown in FIG. 7). Similarly, the input/output controller 720 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It is also contemplated that the computer architecture 700 may not include all of the components shown in FIG. 7, may include other components that are not explicitly shown in FIG. 7, or may utilize an architecture completely different than that shown in FIG. 7.

Based on the foregoing, it should be appreciated that technologies for providing a temporary emergency backhaul link for an RBS over an air interface in response to an interruption or failure of a primary backhaul link of the RBS have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A method for routing backhaul traffic in a wireless telecommunications network, the method comprising:
   detecting, at a first radio base station, a backhaul link failure condition of a backhaul link of the first radio base station;
   in response to detecting the backhaul link failure condition of the backhaul link, establishing, at the first radio base station, an emergency backhaul link with a second radio base station over an air interface, the second radio base station selected from a plurality of radio base stations based on the second radio base station being associated with a priority higher than a priority associated with at least a portion of remaining radio base stations of the plurality of radio base stations;
   transmitting, at the first radio base station, outbound backhaul traffic to the second radio base station, and
   receiving, at the first radio base station, inbound backhaul traffic from the second radio base station via the emergency backhaul link established over the air interface.

2. The method of claim 1, wherein transmitting the outbound backhaul traffic to the second radio base station via the emergency backhaul link comprises transmitting the outbound backhaul traffic to the second radio base station via the emergency backhaul link at a downlink frequency over the air interface, and receiving the inbound backhaul traffic from the second radio base station via the emergency backhaul link comprises receiving the inbound backhaul traffic from the second radio base station via the emergency backhaul link at an uplink frequency over the air interface.

3. The method of claim 1, wherein transmitting the outbound backhaul traffic to the second radio base station via the emergency backhaul link comprises transmitting the outbound backhaul traffic to the second radio base station via the emergency backhaul link at a downlink frequency over the air interface, and receiving the inbound backhaul traffic from the second radio base station via the emergency backhaul link comprises receiving the inbound backhaul traffic from the second radio base station via the emergency backhaul link at the downlink frequency over the air interface.

4. The method of claim 1, wherein detecting, at the first radio base station, the backhaul failure condition of the backhaul link of the first radio base station comprises receiving, at the first radio base station, a notification from a network controller, the notification identifying the backhaul failure condition.

5. The method of claim 1, wherein transmitting the outbound backhaul traffic to the second radio base station and receiving the inbound backhaul traffic from the second radio base station via the emergency backhaul link comprises transmitting the outbound backhaul traffic to the second radio base station and receiving the inbound backhaul traffic from the second radio base station via the emergency backhaul link in accordance with a time division multiplexing scheme.

6. The method of claim 1, wherein establishing, at the first radio base station, the emergency backhaul link with the second radio base station over the air interface comprises:
   generating a broadcast message comprising a request to establish the emergency backhaul link;
   sending the broadcast message to at least the second radio base station; and
   registering with the second radio base station.

7. The method of claim 1, wherein establishing, at the first radio base station, the emergency backhaul link with the second radio base station over the air interface comprises:
   generating a directed message comprising a request to establish the emergency backhaul link;
   sending the directed message to the second radio base station; and
   registering with the second radio base station.

8. The method of claim 1, further comprising tearing down the temporary backhaul link when the backhaul link failure condition no longer exists.

9. The method of claim 1, wherein the backhaul link failure condition comprises one of the following:
   the backhaul link being at least partially severed;
   a performance of the backhaul link falling below a performance threshold for a performance metric of the backhaul link;
   a failure of equipment used to facilitate the backhaul link;
   a maintenance procedure being performed on the backhaul link; or
   an error of a service provider operating the backhaul link.

10. A first radio base station comprising:
    an air interface component;
    a backhaul interface;
    a processor; and
    a memory storing instructions that, when executed, cause the processor to perform operations comprising:
       detecting a backhaul link failure condition of a backhaul link of the first radio base station established via the backhaul interface,
       in response to detecting the backhaul link failure condition of the backhaul link, establishing an emergency backhaul link to a second radio base station over an air interface via the air interface component, the second radio base station being selected from a plurality of radio base stations based on the second radio base station being associated with a priority higher than a priority associated with at last a portion of remaining radio base stations of the plurality of radio base stations,
       transmitting outbound backhaul traffic to the second radio base station, and receiving inbound backhaul traffic from the second radio base station via the emergency backhaul link established over the air interface via the air interface component.

11. The first radio base station of claim 10, wherein transmitting the outbound backhaul traffic to the second radio base station via the emergency backhaul link comprising transmitting the outbound backhaul traffic to the second radio base station at a downlink frequency over the air interface, and wherein receiving the inbound backhaul traffic from the second radio base station via the emergency backhaul link comprises receiving the inbound traffic from the second radio base station via the emergency backhaul link at an uplink frequency over the air interface.

12. The first radio base station of claim 10, wherein transmitting the outbound backhaul traffic to the second radio base station via the emergency backhaul link comprises transmitting the outbound backhaul traffic to the second radio base station via the emergency backhaul link at a downlink frequency over the air interface, and wherein receiving the inbound backhaul traffic from the second radio base station via the emergency backhaul link comprises receiving the inbound traffic from the second radio base station via the emergency backhaul link at the downlink frequency over the air interface.

13. The first radio base station of claim 10, wherein detecting the backhaul failure condition of the backhaul link comprises receiving a notification from a network controller, the notification identifying the backhaul failure condition.

14. The first radio base station of claim 10, wherein transmitting the outbound backhaul traffic to the second radio base station and receiving the inbound backhaul traffic from the second radio base station via the emergency backhaul link comprise transmitting the outbound backhaul traffic to the second radio base station and receiving the inbound backhaul traffic from the second radio base station via the emergency backhaul link in accordance with a time division multiplexing scheme.

15. The first radio base station of claim 10, wherein the backhaul link failure condition comprises one of the following:

the backhaul link being at least partially severed;
a performance of the backhaul link falling below a performance threshold for a performance metric of the backhaul link;
a failure of equipment used to facilitate the backhaul link;
a maintenance procedure being performed on the backhaul link; or
an error of a service provider operating the backhaul link.

16. The first radio base station of claim 10, further comprising instructions that, when executed, cause the processor to perform operations comprising tearing down the temporary backhaul link when the backhaul link failure condition no longer exists.

17. A second radio base station comprising:
a processor; and
a memory storing instructions that, when executed by the processor, cause the processor to perform operations comprising:
receiving, from a first radio base station, a message comprising a request to establish an emergency backhaul link, wherein the second radio base station is selected from a plurality of radio base stations to receive the message based on the second radio base station being associated with a priority higher than a priority associated with at least a portion of remaining radio base stations of the plurality of radio base stations,
in response to receiving the message, establishing the emergency backhaul link to the first radio base station over an air interface,
receiving outbound backhaul traffic from the first radio base station,
transmitting the outbound backhaul traffic over a second backhaul link to a controller,
receiving the inbound backhaul traffic from the controller, and
transmitting the inbound backhaul traffic to the first radio base station.

18. The method of claim 1, wherein the priority associated with the second radio base station is based on the second radio base station having a direct line-of-sight with the first radio base station.

19. The method of claim 1, wherein at least one of the priority associated with the second radio base station or the plurality of radio base stations is dynamic to account for variations in radio propagation characteristics between the first radio base station and each radio base station of the plurality of radio base stations.

* * * * *